US012495079B2

(12) United States Patent
Ichihara et al.

(10) Patent No.: US 12,495,079 B2
(45) Date of Patent: Dec. 9, 2025

(54) COMMUNICATION MANAGEMENT FOR LOCATION CONNECTED TO MOBILE COMMUNICATION NETWORK

(71) Applicant: RAKUTEN MOBILE, INC., Tokyo (JP)

(72) Inventors: Atsushi Ichihara, Tokyo (JP); Masahiko Nanri, Tokyo (JP); Masaki Tanzawa, Tokyo (JP); William Hutchinson Putnam, III, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/579,863

(22) PCT Filed: Jul. 28, 2023

(86) PCT No.: PCT/JP2023/027839
§ 371 (c)(1),
(2) Date: Jan. 17, 2024

(87) PCT Pub. No.: WO2025/027707
PCT Pub. Date: Feb. 6, 2025

(65) Prior Publication Data
US 2025/0080588 A1    Mar. 6, 2025

(51) Int. Cl.
*H04L 9/40* (2022.01)
*H04L 43/20* (2022.01)
*H04W 12/088* (2021.01)

(52) U.S. Cl.
CPC ........... *H04L 63/306* (2013.01); *H04L 43/20* (2022.05); *H04L 63/02* (2013.01); *H04L 63/1425* (2013.01); *H04W 12/088* (2021.01)

(58) Field of Classification Search
CPC ....... H04L 63/306; H04L 43/20; H04L 63/02; H04L 63/1425; H04W 84/02; H04W 12/088; H04W 28/084
See application file for complete search history.

(56) References Cited

U.S. PATENT DOCUMENTS

| 2003/0055982 A1 | 3/2003 | Noro et al. |
| 2004/0172557 A1 | 9/2004 | Nakae et al. |

(Continued)

FOREIGN PATENT DOCUMENTS

| JP | 2003078571 A | 3/2003 |
| JP | 3794491 B2 | 7/2006 |
| JP | 2015082787 A | 4/2015 |

*Primary Examiner* — Schquita D Goodwin
*Assistant Examiner* — Joseph M Cousins
(74) *Attorney, Agent, or Firm* — HAUPTMAN HAM, LLP

(57) ABSTRACT

To increase security when a communication system of a communication operator communicates to and from a server at a site, the communication system executes an application process in an intermediate segment (Step S206), executes a signal process of acquiring upstream data from a signal from a communication terminal via a site antenna (Step S201), executes a relay process of relaying communication between the communication terminal and the application process in an internal network which is communicable to and from a core network system (Step S202), detects an anomaly in communication between the internal network and the intermediate segment (Step S203), and manages the signal process, the relay process, and a virtual process unit of the application process under the control of the communication operator (Step S208).

14 Claims, 9 Drawing Sheets

(56) References Cited

U.S. PATENT DOCUMENTS

| | | |
|---|---|---|
| 2008/0172739 A1 | 7/2008 | Nakae et al. |
| 2008/0253384 A1 | 10/2008 | Noro et al. |
| 2008/0282339 A1 | 11/2008 | Nakae et al. |
| 2008/0301302 A1 | 12/2008 | Noro et al. |
| 2018/0160311 A1* | 6/2018 | Shaw .................. H04L 61/5007 |
| 2020/0022069 A1* | 1/2020 | Salkintzis ............. H04W 48/14 |
| 2022/0038554 A1* | 2/2022 | Merwaday .............. H04L 45/64 |

* cited by examiner

US 12,495,079 B2

COMMUNICATION MANAGEMENT FOR LOCATION CONNECTED TO MOBILE COMMUNICATION NETWORK

RELATED APPLICATIONS

The present application is a National Phase of International Application Number PCT/JP2023/027839, filed Jul. 28, 2023.

TECHNICAL FIELD

The present disclosure relates to communication management for a site connected to a mobile communication network.

BACKGROUND ART

A mobile communication operator arranges devices, including antennas, at sites and a core network system at data centers. A mobile communication service is provided by performing communication between the devices at the sites and the core network system. The devices at the sites and the core network system are connected by a dedicated line.

In JP 2015-082787 A, it is disclosed that two virtual servers are arranged in a DMZ and a plurality of virtual servers are arranged in an internal segment.

In JP 2003-078571 A, it is disclosed that a virtual firewall is built between an Intranet and the Internet.

In JP 3794491 B2, it is disclosed that a virtual server section which is included in a firewall unit distributes request data to any one of an internal network 4 and a decoy device 2.

SUMMARY OF INVENTION

Technical Problem

The inventors are investigating arranging servers which provide some kind of service at a predetermined site, and setting up a communication path between mobile terminals which use a mobile communication service at the site and the servers without involving an ordinary core network system for providing the mobile communication service. In this case, it is conceivable that the device of the mobile communication operator is constantly communicating to and from the servers in the site (some of which may not be designed for direct connection to the Internet). For example, when a server in such a site is cracked, even when a firewall is installed, the security of the core network system may be affected.

The present disclosure has been made in view of the above-mentioned issue, and has an object to provide a technology for increasing security in a case in which a communication system of a communication operator communicates to and from a server at a site providing a service.

Solution to Problem

According to one embodiment of the present disclosure, there is provided a communication system including a site antenna and one or more processors arranged at a site. The communication system executes a signal process, a relay process, a first firewall process, and a management process by causing at least one of the one or more processors arranged at the site to execute a program of a communication service when an application process which provides an application service is executed in an intermediate segment which is one of networks in the site. The signal process is a process of acquiring upstream data from a signal from a communication terminal via the site antenna. The upstream data is data heading for a core network system. The relay process is a process of relaying the acquired upstream data to the intermediate segment based on a predetermined condition in an internal network which is one of the networks in the site and is communicable to and from the core network system. The first firewall process is a process of detecting an anomaly in communication between the internal network and the intermediate segment. The management process is a process of managing a virtual process unit which executes at least a part of the signal process and the relay process. Provision of the application service to the communication terminal is managed by the management process.

Further, according to one embodiment of the present disclosure, there is provided a communication control method including: causing at least one of one or more processors arranged at a site executing a program of an app operator to execute an application process; and causing the at least one of the one or more processors arranged at the site executing a program provided by a communication operator different from the app operator to execute a signal process, a relay process, a first firewall process, a second firewall process, and a management process. The application process is a process of communicating in an intermediate segment which is a network in the site and providing an application service of the app operator. The signal process is a process of acquiring upstream data from a communication terminal via the site antenna. The upstream data is data heading for a core network from a signal. The relay process is a process of relaying the acquired upstream data to a virtual process unit which executes the application process based on a predetermined condition in an internal network which is one of networks in the site and is communicable to and from the core network system. The first firewall process is a process of detecting an anomaly in communication between the internal network and the intermediate segment. The management process is controlled by the communication operator, and is a process of managing a virtual process unit which executes at least a part of the signal process and the relay process. The virtual process unit which provides the application service of the app operator is managed by the management process controlled by the communication operator.

DESCRIPTION OF EMBODIMENTS

An embodiment of the present disclosure is now described in detail with reference to the drawings.

Figure 1:
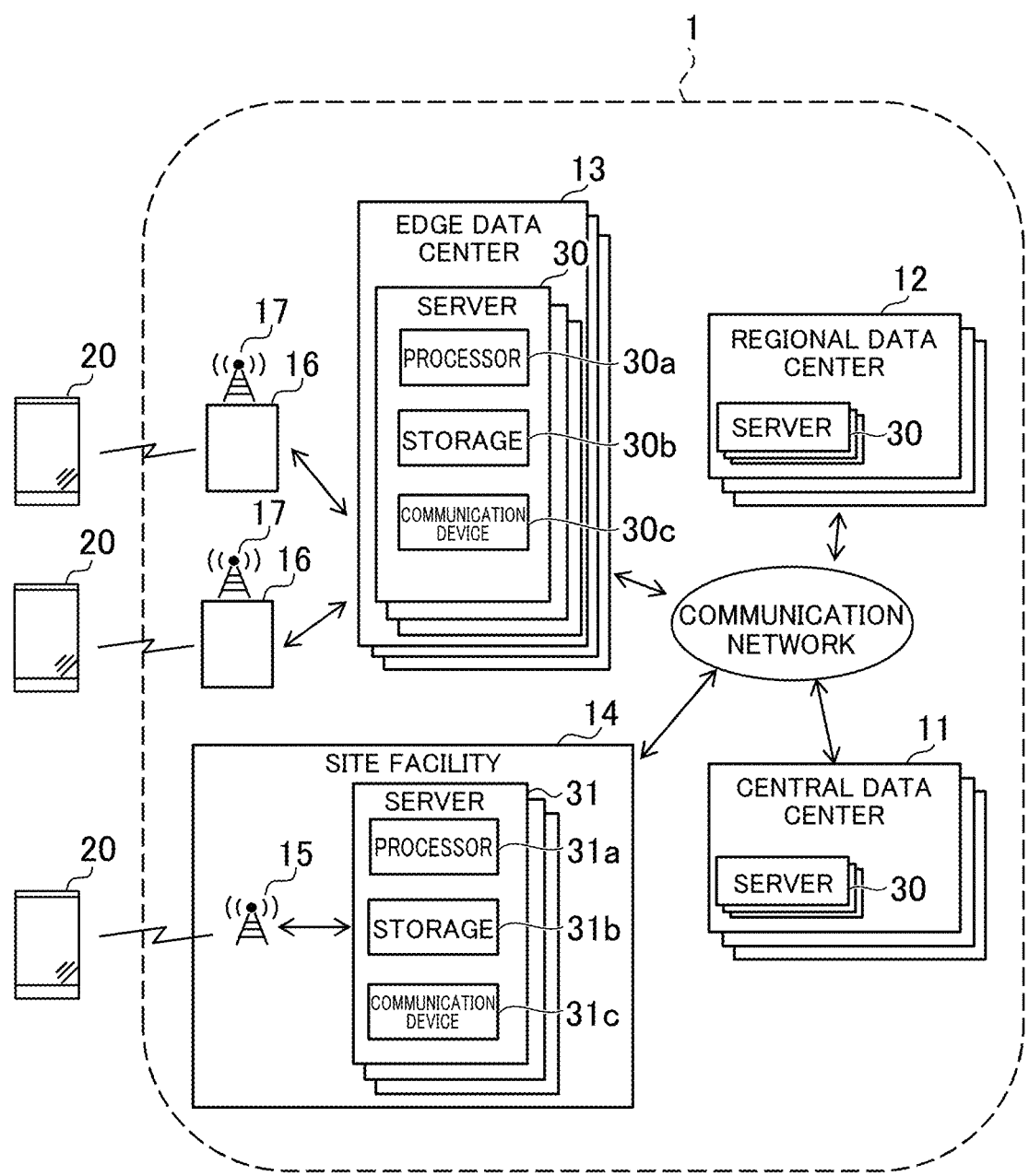
FIG. 1 is a diagram for illustrating an example of a communication system in an embodiment of the present disclosure.
Figure 2:
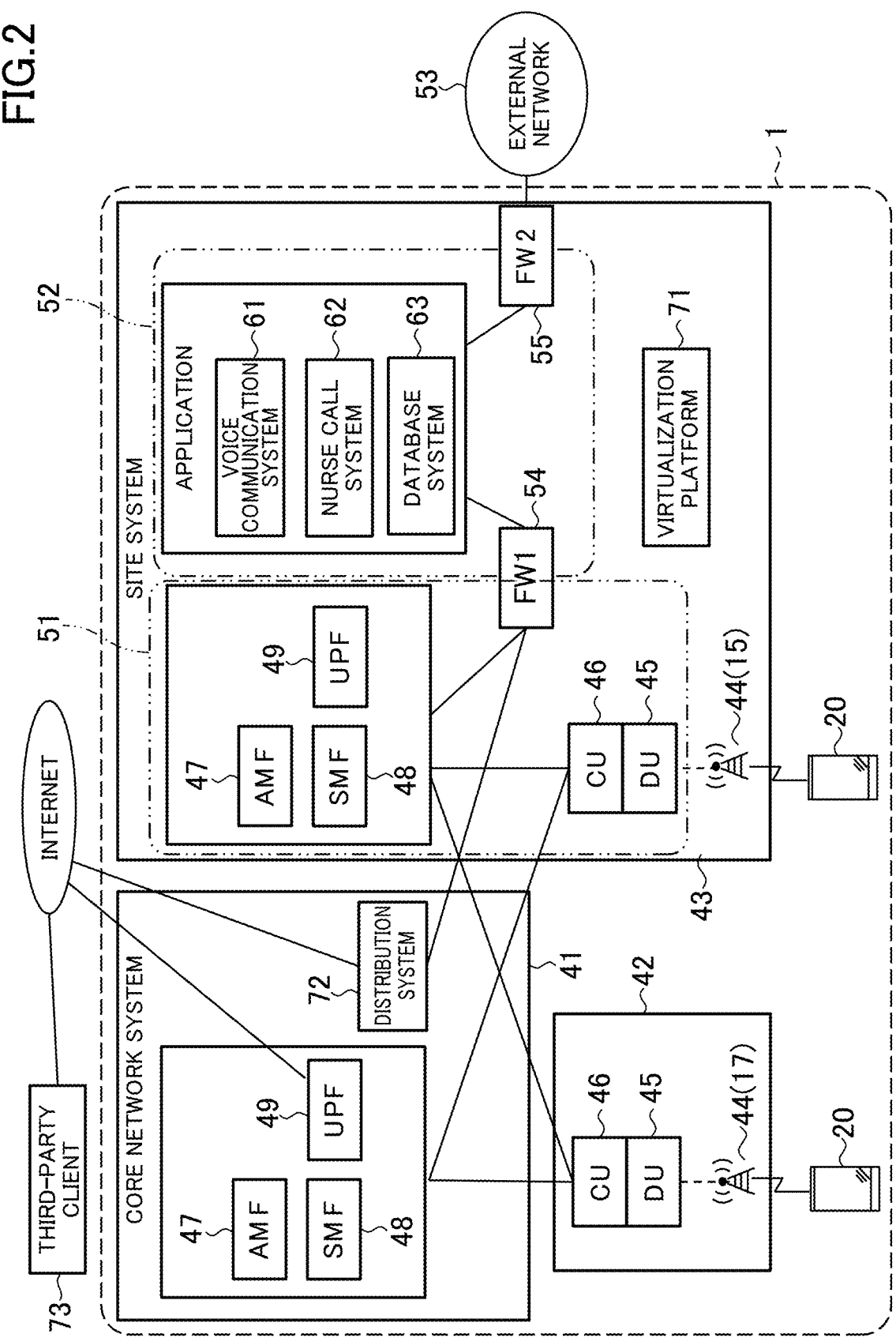
FIG. 2 is a diagram for schematically illustrating the communication system in the embodiment.

FIG. 1 and FIG. 2 are each a diagram for illustrating an example of a communication system 1 in the embodiment of the present disclosure. FIG. 1 is an illustration drawn with attention being given to locations of facilities included in the communication system 1. The communication system 1 provides a mobile communication network.

As illustrated in FIG. 1, the communication system 1 includes, as facilities, central data centers 11, regional data centers 12, edge data centers 13, site facilities 14, and base station facilities 16. Each base station facility 16 is a facility for wireless mobile communication to and from a communication terminal 20. Each base station facility 16 includes an antenna 17 and a radio unit (RU), which is described later. Each site facility 14 includes an antenna 15, an RU (not shown), and a plurality of servers 31. Each site facility 14 corresponds to a site such as a hospital facility or an office building, for example.

The communication terminals 20 are referred to as "user equipment (UE)." For example, each communication terminal 20 can be a mobile terminal such as a smart phone or a laptop computer, and can be connected to a mobile communication network by wireless communication.

The mobile communication network provides communication between a certain communication terminal 20 and another communication terminal 20 and between the communication terminals 20 and the Internet. The communication system 1 may further provide a communication terminal 20 which communicates to and from the antenna 15 of a certain site facility 14 with a network site connection network connected to a system existing at the site corresponding to the site facility 14. The network is hereinafter referred to as "site connection network," and when only the term "site connection network" is used, the term corresponds to a specific network slice thereof.

The central data centers 11, the regional data centers 12, and the edge data centers 13 are collectively referred to as "data center group." For example, there are several central data centers 11, several tens of regional data centers 12, and several thousand to several tens of thousands of edge data centers 13.

For example, the central data centers 11 are dispersedly arranged in an area (for example, in Japan) covered by the communication system 1. The regional data centers 12 are dispersedly arranged in the area covered by the communication system 1. For example, when the area covered by the communication system 1 is the entire area of Japan, one or two regional data centers 12 may be arranged in each prefecture.

Each of the edge data centers 13 can communicate to and from the base station facility 16. One edge data center 13 may be capable of communicating to and from a plurality of the base station facilities 16.

In this embodiment, for example, the central data centers 11, the regional data centers 12, and the edge data centers 13 can communicate to and from each other via a communication network. Further, the central data centers 11, the regional data centers 12, and the edge data centers 13 can communicate among themselves via a communication network.

A plurality of servers 30 are arranged in each of the central data centers 11, the regional data centers 12, and the edge data centers 13 in this embodiment.

Each of the plurality of servers 30 includes one or more processors 30a, a storage 30b, and a communication device 30c. The plurality of servers 30 arranged in the central data centers 11, the regional data centers 12, and the edge data centers 13 provide a kind of cloud platform by a virtualized application execution environment, which is described later.

Further, each of the plurality of servers 31 arranged at the site facility 14 includes one or more processors 31a, a storage 31b, and a communication device 31c. A virtualized application execution environment is implemented in the plurality of servers 31.

The processors 30a and 31a are each a program control device such as a microprocessor which operates in accordance with a program. The storage 30b is, for example, a storage element, such as a ROM or RAM, a solid state drive (SSD), a hard disk drive (HDD), or the like. The storages 30b and 31b each store a program to be executed by the processor 30a or 31a, and the like. The communication devices 30c and 31c are each, for example, a communication interface, such as a network interface controller (NIC) or a wireless local area network (LAN) module. The communication devices 30c and 31c each exchange data with other servers or network devices. The communication devices 30c and 31c may each form a part of software-defined networking (SDN). The servers 30 and 31 may be highly versatile computers, but a part of the servers 30 and 31 may be specific-purpose computers (also referred to as "dedicated servers") which efficiently execute specific processes, for example, network communication.

In this embodiment, a container-type virtualized application execution environment such as Docker (trademark) is installed in the servers 30 arranged in the central data center 11, the regional data center 12, and the edge data center 13. In the container-type virtualized application execution environment, containers can be deployed in those servers 30 and operated. In those servers 30, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

A container-type virtualized application execution environment and a container management tool may also be installed on the servers 31. A cluster formed of one or more containers generated by such a virtualization technology may be constructed in those servers 31.

FIG. 2 is a diagram for schematically illustrating the communication system 1 in this embodiment. FIG. 2 is a diagram for illustrating internal functions and processes of the communication system 1 in particular.

The communication system 1 includes, in terms of function and processes, a core network system 41, a plurality of base station systems 42, a site system 43. The core network system 41, the base station systems 42, and the site system 43 are connected by a network (not shown) such as a software-defined network (SDN) so that the systems can communicate to and from each other.

Each base station system 42 includes a distributed unit (DU) 45 and a central unit (CU) 46. The core network system 41 includes a plurality of access and mobility management functions (AMFs) 47, a plurality of session management functions (SMFs) 48, and a plurality of user plane functions (UPFs) 49. Each base station system 42 includes a radio unit (RU) 44 and an antenna 17, and the RU 44 is a radio transceiver which communicates to and from the communication terminals 20. The RUs 44 are mainly arranged at the base station facilities 16 and the site facilities 14, and communicate to and from the DU 45 of the same base station system 42.

Each site system 43 includes an RU 44, a DU 45, a CU 46, an AMF 47, an SMF 48, a UPF 49, a first firewall 54, a second firewall 55, a voice communication system 61, a nurse call system 62, and a virtualization platform 71. The site system 43 includes the RU 44 and the antenna 15 arranged at the site, and the RU 44 is a radio transceiver. The RU 44 communicates to and from the DU 45 of the same site system 43.

In terms of network structure, the DU 45, the CU 46, the AMF 47, the SMF 48, and the UPF 49 of the site system 43 are arranged in an internal network 51. The voice communication system 61, the nurse call system 62, and a database system 63 are examples of applications. In terms of network structure, the applications are arranged in an intermediate segment 52. In terms of network structure, the first firewall 54 is arranged at the boundary between the internal network 51 and the intermediate segment 52. In terms of network structure, the second firewall 55 is arranged at the boundary between the intermediate segment 52 and an external network 53.

The site system 43 may include, as applications, for example, at least one of the voice communication system 61, the nurse call system 62, or the database system 63, and may also include other application systems.

The external network 53 connected to the site system 43 via the second firewall 55 may be a LAN of the hospital or office of the site. The external network 53 is connected to the Internet. The external network 53 may be a network of a communication operator providing a connection to the Internet.

The functions and the processes of the core network system 41 and the base station systems 42 may be implemented by one or more processors 30*a* included in one or more servers 30 executing programs (executable instructions) stored in the storage 30*b*. A so-called container management tool may manage the storage of the programs (program modules) corresponding to respective components of the systems in the storage 30*b* and the execution by the processor(s) 30*a*.

Further, the functions and the processes of the site systems 43 may be implemented by one or more processors 31*a* included in one or more servers 31 executing programs (executable instructions) stored in the storage 31*b*. A so-called container management tool may manage the storage of the programs (program modules) corresponding to respective components of the system in the storage 31*b* and the execution by the processor(s) 31*a*.

The DUs 45 and the CUS 46 included in the base station systems 42 and the site systems 43 are each 5G DUs and 5G CUs. The DUs 45 each execute a signal process by one or more processors 30*a* or 31*a* executing a program of a communication service. The signal processing is to process an upstream signal acquired from the communication terminal 20 via the RU 44 to acquire upstream data. Further, the DU 45 which executes the signal process converts downstream data destined for the communication terminals 20 to downstream signals for wireless transmission. The downstream signals are wirelessly transmitted from the RUs 44.

The DUs 45 may include, for example, the functions of a PHY-High layer, a MAC layer, and an RLC layer in so-called 4G and 5G. Further, the functions of the CUS 46 may include the functions of a PDCP layer and a PRC/SDAP layer. The boundaries of the function layers between the DUs 45 and the CUS 46 may differ from the example described above. The MAC layer performs wireless resource allocation, for example, and the RLC layer performs retransmission control, for example.

As used herein, an upstream signal is the signal input from the communication terminal 20 side to the DU 45, and a downstream signal is the signal that is output from the DU 45 toward the communication terminal 20. Data output from the DU 45 to the core network system 41 (for example, AMF 47 or UPF 49) is upstream data, and data output from the core network system 41 to the DU 45 is downstream data.

The DUs 45 and the CUS 46 included in the base station systems 42 are mainly arranged in the edge data centers 13. More specifically, those DUs 45 and CUs 46 may be implemented by one or more servers 30 arranged at the edge data centers 13. A given edge data center 13 may include a plurality of sets each including one or more DUs 45 and one CU 46, and the plurality of DUs 45 included in the set may be connected to the CU 46 of the set. The DUs 45 and the CUS 46 included in the base station systems 42 may be arranged in a data center different from the edge data center 13.

The DUs 45 and the CUS 46 included in the site systems 43 may be implemented by one or more servers 31 arranged at the site facilities 14.

The DUs 45 and the CUS 46 included in the base station systems 42 and the site systems 43 may be virtual distributed units (vDUs) and virtual central units (vCUs) in 4G, respectively. A part of the DUs 45 and the CUS 46 may be implemented in the central data centers 11 or the regional data centers 12 instead of the edge data centers 13. The RUs 44, the DUs 45, and the CUs 46 form a radio access network (RAN).

The RAN is a computer system which is provided with the antenna, and corresponds to an eNodeB (eNB) in a fourth generation mobile communication system (hereinafter referred to as "4G") and an NR base station (gNB) in a fifth generation mobile communication system (hereinafter referred to as "5G"). The core network system 41 and the RAN cooperate with each other to implement a mobile communication network which communicates to and from the communication terminal 20.

The core network system 41 is a system corresponding to an evolved packet core (EPC) in 4G or a 5G core (5GC) in 5G. The core network systems 41 in this embodiment are implemented mainly by the plurality of servers 30 arranged in the central data centers 11 or the regional data centers 12. As described above, the core network system 41 includes NFs such as a plurality of AMFs 47, a plurality of SMFs 48, and a plurality of UPFs 49, as software functional units. The core network system 41 is connected to an external network such as the Internet.

The AMF 47 receives a connection request from the communication terminal 20 via the gNB, and authenticates the communication terminal 20. When the communication terminal 20 is authenticated, the AMF 47 registers information for enabling incoming calls to the communication terminal 20 (information indicating the position of the communication terminal 20) in an internal database. When the communication terminal 20 is authenticated after the AMF 47 receives the connection request, the SMF 48 establishes a communication path (PDU session) between the communication terminal 20 and an appropriate UPF 49.

When a connection to a network other than the site connection network is requested from the communication terminal 20 which wirelessly communicates to and from the base station system 42, the SMF 48 establishes a communication path between the UPF 49 included in the core network system 41 and the communication terminal 20. When a connection to the site connection network is requested, the SMF 48 may establish a communication path between the UPF 49 included in the site system 43 and the communication terminal 20.

A UPF 49 included in the core network system 41 uses at least one of the one or more processors 30a to execute a core relay process for relaying communication data between the communication terminal 20 and an external network such as the Internet.

The AMF 47, the SMF 48, and the UPF 49 included in the site system 43 each have the same function as in the core network system 41, but are arranged in the site facility 14. Further, those AMF 47, SMF 48, and UPF 49 can authenticate the communication terminal 20, establish a communication path, and relay the communication data, respectively, regarding the processes of the network slice of the site connection network.

The CU 46 included in the site system 43 executes a site request process by causing at least one of the one or more processors 31a to execute a program of the communication service. In the site request process, the CU 46 requests control of the communication to the AMF 47 corresponding to the network slice to which the communication terminal 20 requests connection.

In the site request process, the CU 46 included in the site system 43 selects any one of the AMF 47 (control process) of the core network system 41 and the AMF 47 (control process) of the site system 43, and requests communication control. More specifically, in the site request process, when the CU 46 receives a request for connection to the site connection network from the communication terminal 20 via the antenna 15 of the site, the CU 46 requests the AMF 47 of the site system 43 to control connection of the communication by the communication terminal 20. The AMF 47 controls connection of the communication together with the SMF 48 based on the request. Meanwhile, when the CU 46 receives a request for connection to a network other than the site connection network from the communication terminal 20 via the antenna 15, the CU 46 requests the AMF 47 of the core network system to control connection of the communication of the communication terminal 20.

Further, the UPF 49 included in the site system 43 executes a site relay process by causing at least one of the one or more processors 31a to execute a program of the communication service. In the site relay process, the UPF 49 establishes a communication path to the communication terminal 20 under the control of the SMF 48 of the site system 43, and relays the communication between the communication terminal 20 and the applications in the site system 43 or the external network 53. More specifically, the UPF 49 acquires upstream data from the communication terminal 20 via the communication path, and transmits the upstream data to an application or the external network 53. Further, the UPF 49 receives downstream data from the application or the external network and transmits the downstream data to the 53, communication terminal 20 via the communication path.

When the communication terminal 20 communicates to and from the application or the external network 53 via the antenna 15 of the site facility 14, the communication is performed via the UPF 49 of the site system 43, and hence the core network system 41 is not used. This is referred to as "local breakout." The local breakout enables efficient communication between the communication terminal 20 and other systems at the site, and enables the load on the core network system 41 to be reduced.

The applications execute application processes by using at least one of the one or more of processors 31a. Examples of the application processes include a session initiation protocol (SIP) process, a nurse call process, and a database process.

The voice communication system 61 which executes the SIP process implements a call between an external telephone device and an extension telephone device (for example, the communication terminal 20) via a telephone line, or a call between extension telephone devices.

The nurse call system 62 which executes the nurse call process is a system which manages reports from patients in the hospital, and may be communicatively connected to a communication device arranged on a bed and a device arranged at a control center in the hospital. Those devices may be the communication terminal 20 or may be devices connected to the external network 53. The nurse call system 62 may communicate to and from the communication terminal 20 via the UPF 49, or may communicate to and from a device on the external network 53.

The database system 63 which executes the database process may implement a database management system, and for example, may execute medical record management in a hospital or may distribute advertisements registered in the database to the communication terminal 20.

The applications including the voice communication system 61, the nurse call system 62, and the database system 63 are not installed directly on the server 31, and each application operates as a virtualized virtual process unit (for example, container, pod, or virtual server) on one of the plurality of servers 31.

The first firewall 54 executes a first firewall process by causing at least one of the one or more of processors 31a to execute a program of the communication service. The first firewall 54 which executes the first firewall process detects an anomaly (illegal communication) in the communication between the internal network 51 and the intermediate segment 52. The internal network 51 is also connected to the core network system 41, and thus the first firewall 54 is very important in preventing entry into the core network system 41 from the intermediate segment 51 and the external network 53. The first firewall 54 may execute not only so-called packet filtering including stateful packet inspection (SPI), but also filtering at the application protocol level and an illegal intrusion control process referred to as IDS/IPS. Further, the first firewall 54 can also control access from a distribution system 72 in order to prevent illegal intrusion from the core network system 41 side.

The second firewall 55 executes a second firewall process by causing at least one of one or more of processors 31a to execute a program of the communication service. The second firewall 55 which executes the second firewall process detects an anomaly in the communication between the intermediate segment 52 and the external network 53. The second firewall 55 may perform the same type of illegality detection process as that of the first firewall 54, or may perform a different type of illegality detection process from that of the first firewall 54. The illegality detection process increases the security between the site system 43 and the external network 53.

The first firewall 54 and the second firewall 55 may operate in a dedicated device including the processor 31a, or may operate on a general-purpose server 31 which includes the processor 31a. Further, the first firewall 54 and the second firewall 55 may each operate on any one of the plurality of servers 31 as a virtualized virtual process unit (for example, container, pod, or virtual server).

The virtualization platform 71 in the site system 43 executes a management process and an update process by causing at least one of the one or more processors 31a to execute a program of the communication service. The virtualization platform 71 which executes the management process manages virtual process units executed on one or more servers 31. Management of the virtual process units may include, for example, at least one of starting and ending the processes of the virtual process units, or construction relating to the virtual process units (for example, setting the servers to execute the virtual process units, and connecting and disconnecting the networks to be connected to the virtual process units). The virtualization platform 71 may include a virtualized application execution environment and container management tools. The update process is described later.

Figure 3:
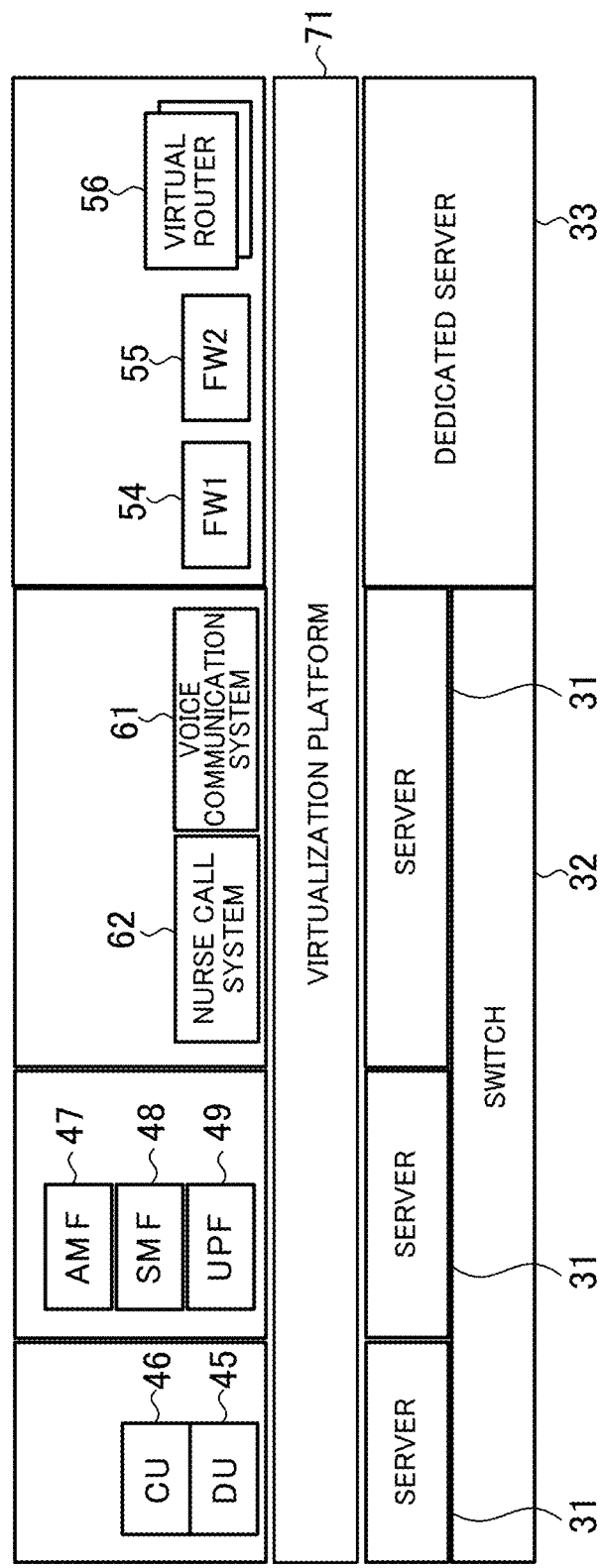
FIG. 3 is a diagram for illustrating an example of virtualization in a site system.

FIG. 3 is a diagram for illustrating an example of virtualization in the site system 43. In FIG. 3, hardware and an OS are illustrated below the virtualization platform 71, and examples of virtual process units are illustrated above the virtualization platform 71. For ease of description, an illustration of the database system 63 is omitted. A part of the virtual process units illustrated in FIG. 3 may be executed on physical hardware (for example, servers). For example, the DU 46 may exist on a server outside the virtualization platform 71, and a part of the routers may implemented by using dedicated hardware so that not all of the routers are virtualized.

The site system 43 physically includes one or more servers 31, a switch 32, and a dedicated server 33. The switch 32 implements a network connection to devices such as the one or more servers 31 and the dedicated server 33. The switch 32 relays packets at a so-called L2 layer by using a virtual local area network (VLAN) so as to prevent communication between each of a plurality of segments that does not go through a router or the like. The dedicated server 33 is a type of server 31, and thus has a configuration suitable for network communication. The dedicated server 33 may have special hardware as a network device, such as a communication port or an accelerator.

A virtual router 56 is a so-called virtualized router. The virtual router 56 is a virtual process unit which executes processes such as routing, and each virtual router 56 is connected to one or more network segments.

In the example of FIG. 3, the CU 45, the DU 46, the AMF 47, the SMF 48, the UPF 49, the voice communication system 61, and the nurse call system 62 are each executed by one of the plurality of servers 31. Each of those may be executed by any of the servers 31 under the control of the virtualization platform 71. In FIG. 3, the first firewall 54, the second firewall 55, and the plurality of virtual routers 56 are executed by the dedicated server 33, but those may be executed on a general-purpose server 31. The dedicated server 33 may be a physical router. Actually, there are products capable of constructing a plurality of virtual routers on a physical router. The plurality of virtual routers 56 may be constructed by using such a physical router.

The distribution system 72 executes a distribution process by using at least one of the one or more processors 30a arranged in the data center. The distribution system 72 which executes the distribution process distributes, when a distribution instruction is received from a third party via the Internet, an update program for the programs implementing the applications to the virtualization platform 71 of the site system 43.

The virtualization platform 71 which executes the update process updates the program which implements the process of the application based on the distributed update program. The application process is executed based on the updated program. The distribution system 72 distributes the update program from the core network side, where security is easier to ensure, and the virtualization platform 71 updates the program of the application based on the update program, and as a result an illegal update program can be prevented from being distributed. The update process described here is an example of virtualization mainly using a container. When the virtualization is performed by a virtual server, the update process may be executed by a virtual process unit which executes the application process. In this case, the distribution system 72 distributes the update program to the virtual process unit of the application in the intermediate segment 52 via the first firewall 54.

A third-party client 73 is a computer to be used by a vendor providing an application to communicate to and from the distribution system 72 and to issue distribution instructions. The third-party client 73 is connected to the distribution system 72 via the Internet.

Figure 4:
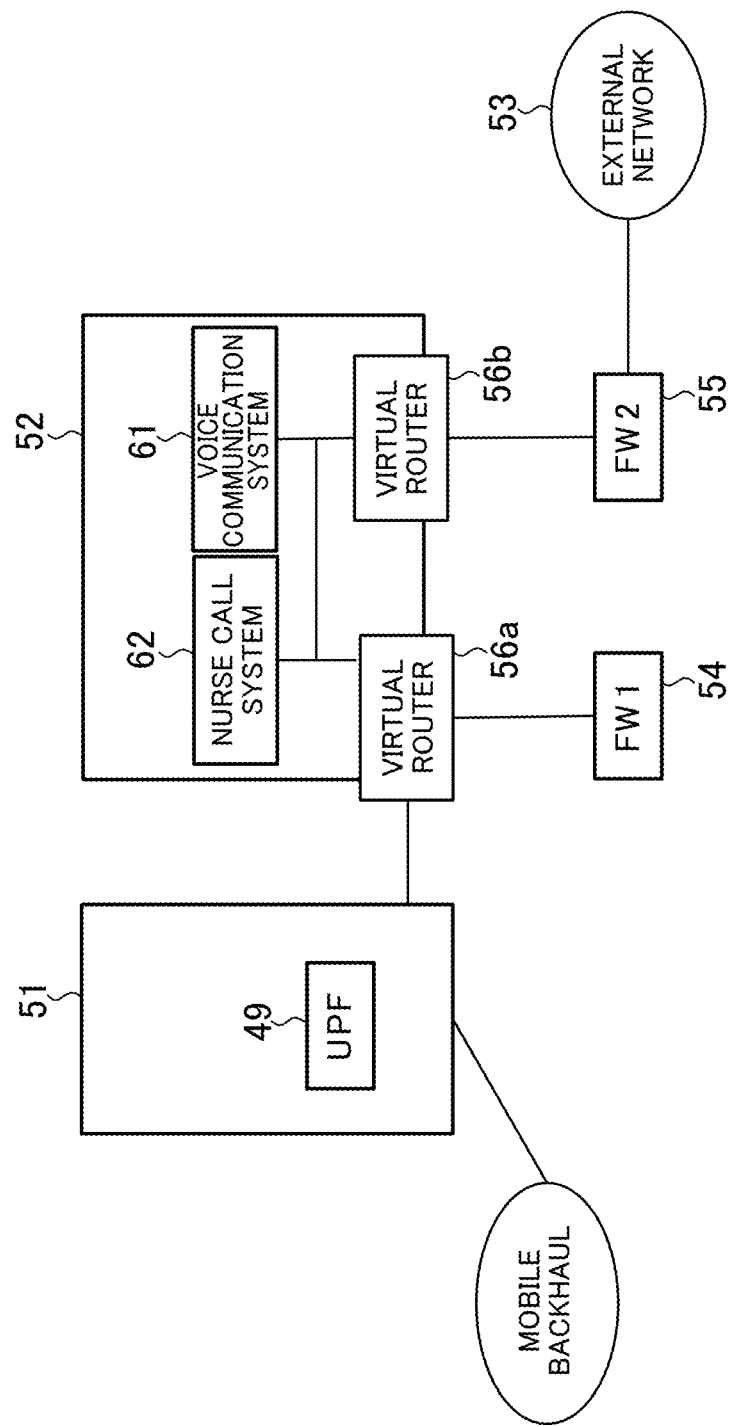
FIG. 4 is a diagram for schematically illustrating an example of a network configuration in the communication system.

FIG. 4 is a diagram for schematically illustrating an example of a network configuration in the communication system 1. A virtual process unit of the UPF 49 is connected to the internal network 51. The internal network 51 is connected to a mobile backhaul for connecting to the core network system 41. The connected mobile backhaul may have a publicly known network configuration. Virtual process units of applications such as the voice communication system 61 and the nurse call system 62 are connected to the intermediate segment 52.

In terms of network structure, a virtual router 56a and the first firewall 54 are connected between the intermediate segment 52 and the internal network 51. Further, in terms of network structure, a virtual router 56b and the second firewall 55 are connected between the intermediate segment 52 and the external network 53.

Figure 5:
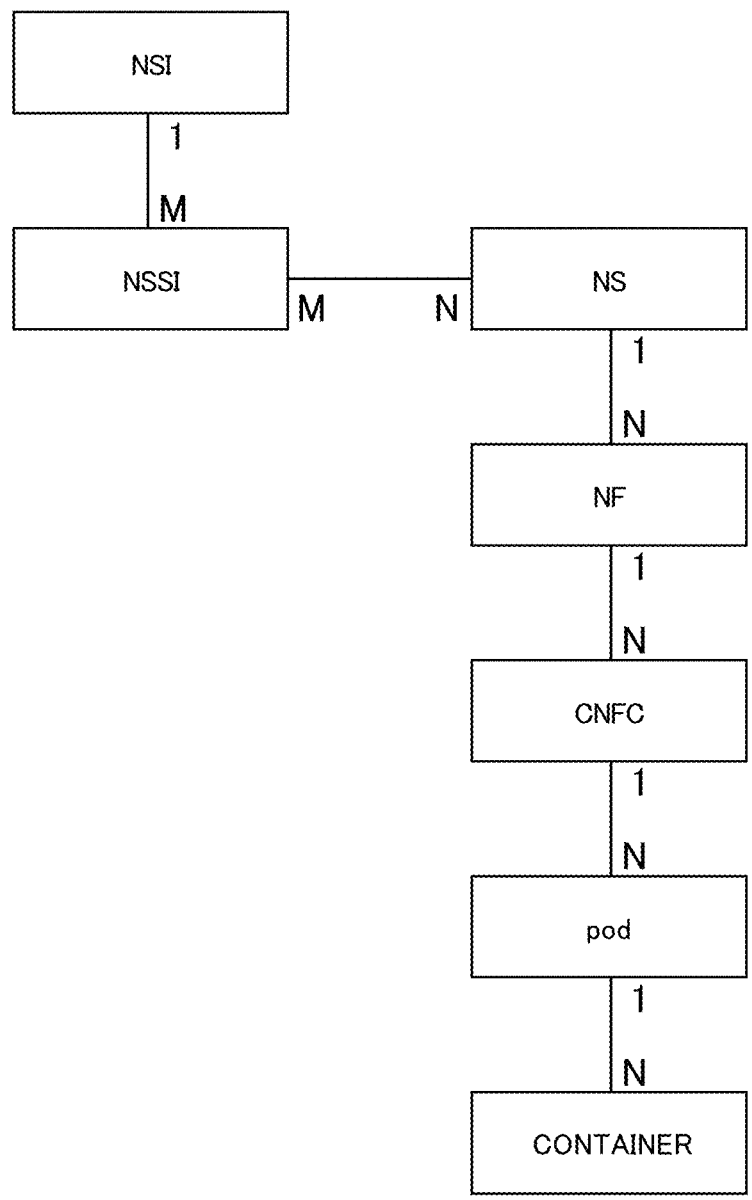
FIG. 5 is a diagram for illustrating an example of links between elements constructed in the communication system in the embodiment.

In the example of FIG. 4, packets (for example, downstream data) heading from the intermediate segment 52 to the internal network 51 is transferred to, in order, the virtual router 56a, the first firewall 54, the virtual router 56a, and the internal network 51. Packets from the internal network 51 to the applications on the intermediate segment 52 are transferred in the reverse order to that. Further, packets (for example, downstream data) heading from the external network 53 to the intermediate segment 52 are transferred to, in order, the second firewall 55, the virtual router 56b, and the intermediate segment 52. Packets heading for the external network 53 from the intermediate segment 52 are transferred in the reverse order to that. In the example of FIG. 5, the communication route between the virtual router 56a and the first firewall 54 is partially different from the communication route between the virtual router 56b and the second firewall 55. However, as long as the packets pass through the first firewall 54 or the second firewall 55, the communication route may be set in any manner. The virtual router 56a may transfer packets that are clearly not illegal to the intermediate segment 52 without passing through the first firewall 54.

The routing between the networks may be performed by each virtual process unit based on the settings in an internal routing table, or only a default gateway may be set in each virtual process unit and the virtual router 56 may perform the routing between the networks. Further, a virtual router may be constructed as a virtual process unit in the virtualization platform, and the virtual router may perform the routing.

There is now described a method for implementing the functions of the communication system 1 in this embodiment. The communication system 1 is formed of a plurality of functional units (for example, network functions (NFs)) in order to implement network services. In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or more CNFs. The functional unit in this embodiment may also correspond to a network node.

FIG. 5 is a diagram for schematically illustrating an example of links between elements constructed in the communication system 1 in this embodiment. Symbols M and N indicated in FIG. 5 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 5, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB).

In 5G, the NF corresponds to an element having a granularity, such as the DU 45, the CU 46, or the UPF 49. The NF also corresponds to an element having a granularity, such as the AMF 47, the SMF, or the UPF 49. In 4G, the NF corresponds to an element having a granularity, such as a mobility management entity (MME), a home subscriber server (HSS), a serving gateway (S-GW), a vDU, or a vCU. In this embodiment, for example, one NS includes one or more NFs. That is, one or more NFs are under the control of one NS.

The CNFC corresponds to an element having a granularity, such as DU mgmt or DU processing. The CNFC may be a microservice deployed on the server 30 as one or more containers. For example, some CNFCs may be microservices that provide a part of the functions of the DU 45, the CU 46, and the like. Some CNFCs may be microservices that provide a part of the functions of the UPF 49, the AMF 47, the SMF, and the like. In this embodiment, for example, one NF includes one or more CNFCs. That is, one or more CNFCs are under the control of one NF.

The pod refers to, for example, the minimum unit for managing a Docker container by Kubernetes. In this embodiment, for example, one CNFC includes one or more pods. That is, one or more pods are under the control of one CNFC.

In this embodiment, for example, one pod includes one or more containers. That is, one or more containers are under the control of one pod. Those pods or containers correspond to the above-mentioned virtual process units, operate under the control of the virtualization platform 71, and are managed by the virtualization platform 71.

In addition, as illustrated in FIG. 5, a network slice (NSI) and a network slice subnet instance (NSSI) have a hierarchical structure.

The NSIs can be said to be end-to-end virtual circuits that span a plurality of domains (for example, from the RAN to the core network system 41). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of communication terminals (for example, for massive machine type communication (mMTC)). The NSSIs can be said to be single domain virtual circuits dividing an NSI. Each NSSI may be a slice of a RAN domain, a slice of a mobile back haul (MBH) domain, or a slice of a core network domain.

In this embodiment, for example, one NSI includes one or more NSSIs. That is, one or more NSSIs are under the control of one NSI. In this embodiment, a plurality of NSIs may share the same NSSI.

In addition, as illustrated in FIG. 5, the NSSI and the NS generally have a many-to-many relationship.

In addition, in this embodiment, for example, one NF can belong to one or more network slices. Specifically, for example, network slice selection assistance information (NSSAI) including one or more pieces of sub-network slice selection assist information (S-NSSAI) can be set for one NF. In this case, the S-NSSAI is one piece of information for identifying the network slice. At least a part of the NFs are not required to belong to the network slice.

Figure 6:
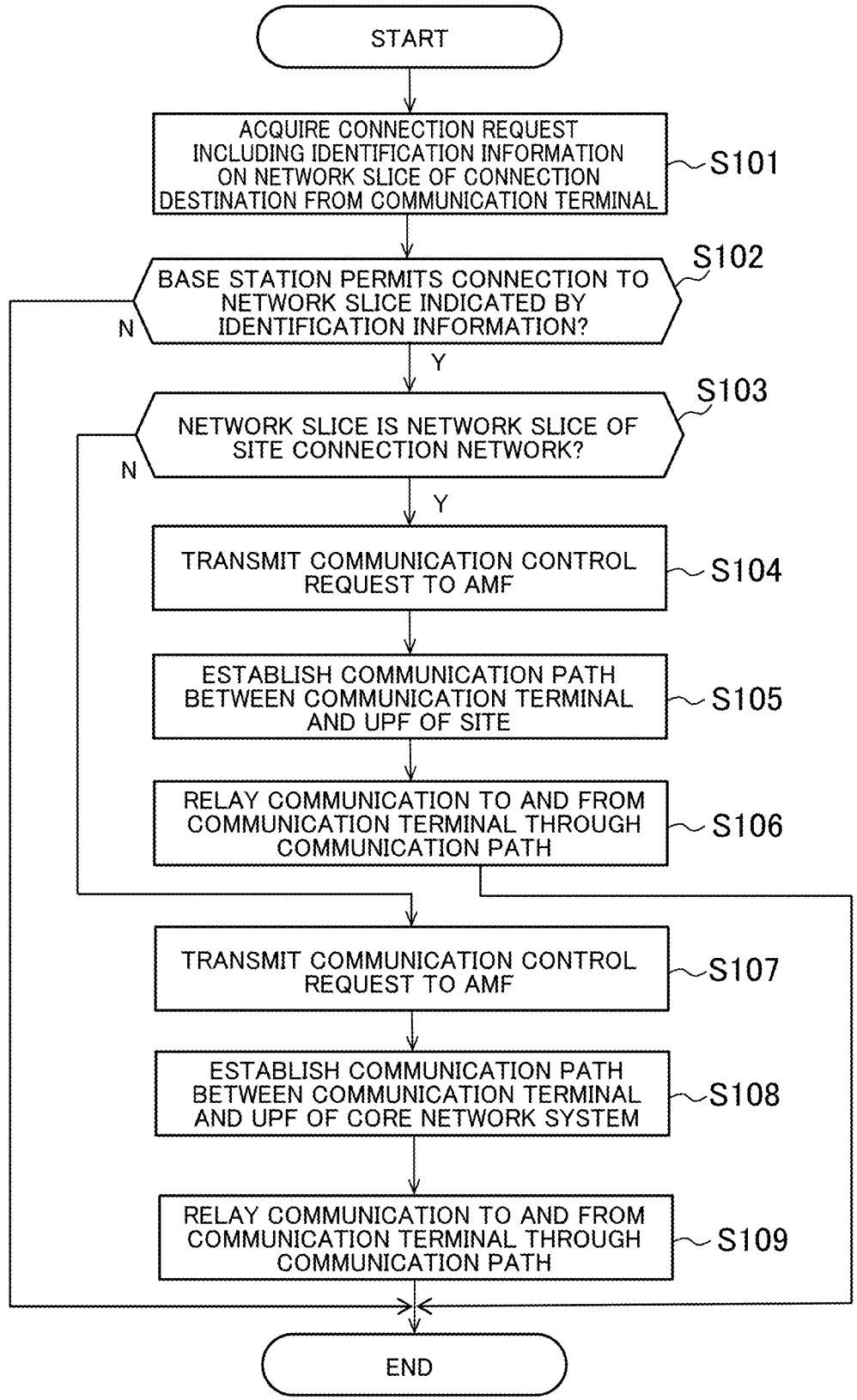
FIG. 6 is a flow chart for illustrating an outline of a process of the communication system performed when a communication terminal connects to a mobile communication network.

Next, the operation performed when the communication terminal 20 connects to the mobile communication network is described. FIG. 6 is a flow chart for illustrating an outline of a process of the communication system 1 performed when the communication terminal 20 connects to the mobile communication network. In FIG. 6, there is illustrated a process performed when the communication terminal 20 starts communication via the antenna 15 arranged at the site facility 14. A specific procedure for connecting the communication terminal 20 to the mobile communication network is publicly known, and thus in FIG. 6, an illustration of processes which are not particularly related to connection to the network slice of the site connection network is omitted.

It is assumed that the CUS 46 included in the site system 43 and the base station system 42 have a list of network slices supported by the base station including the CU 46 registered in advance, and that communication to and from the AMFs 47 corresponding to those supported network slices is enabled in advance in each of the CUS 46. Those AMFs 47 may belong to the core network system 41 or the site system 43.

First, the communication terminal 20 transmits, to the CU 46 via the antenna 15, a connection request including identification information on the network slice for which connection is desired, and the CU 46 acquires the connection request from the communication terminal 20 (Step S101). The network slice identification information may be, for example, the S-NSSAI included in the NSSAI from the communication terminal 20, or may be other information. The communication terminal 20 may have a table that associates applications with identification information (for example, NSSAI), and the communication terminal 20 may assign identification information only to the upstream signals of the applications registered in the table. When the connection request does not include the identification information on the network slice, the network slice is not used.

Next, the CU 46 examines whether or not the base station permits connection to the network slice indicated by the identification information acquired from the communication terminal 20 (Step S102). The CU 46 may determine that the connection is permitted when the identification information acquired from the communication terminal 20 is registered in the list of network slices supported by the base station. When the connection to the network slice indicated by the identification information acquired from the communication terminal 20 is not permitted ("N" in Step S102), the process of FIG. 6 ends and the communication terminal 20 is not connected.

Meanwhile, when the connection to the network slice indicated by the identification information acquired from the communication terminal 20 is permitted ("Y" in Step S102), the CU 46 determines whether or not the network slice to which the communication terminal 20 requests connection is the network slice of the site connection network (Step S103).

When the network slice to which connection is requested is the network slice of the site connection network ("Y" in Step S103), the CU 46 transmits a communication control request to the AMF 47 and the SMF 48 included in the site system 43 (Step S104). The AMF 47 and the SMF 48 execute processes such as authentication of the communication terminal 20 for the network slice, and the SMF 48 establishes a communication path (PDU session) between the communication terminal 20 and the UPF 49 included in the site system 43 (Step S105). The UPF 49 then relays communication between the communication terminal 20 and the application or the external network 53 through the communication path (Step S106).

Meanwhile, when the network slice to which connection is requested is a network slice different from that of the site connection network or when the connection request does not contain the identification information on the network slice ("N" in Step S103), the CU 46 transmits a communication control request to the AMF 47 included in the core network system 41 (Step S107). The AMF 47 then executes processes such as authentication of the communication terminal 20, and the SMF 48 establishes a communication path (PDU session) between the communication terminal 20 and the UPF 49 included in the core network system 41 (Step S108). The UPF 49 then relays communication between the communication terminal 20 and the application or the external network 53 through the communication path (Step S109). In this case, the AMF 47 included in the core network system 41 may be set as the primary AMF 47 which transmits the control request, and the AMF 47 included in the site system 43 may be set as a secondary AMF 47. In Step S107, when the CU 46 is not in a communicable state to and from the primary AMF 47 due to a failure or the like, the CU 46 may transmit a control request to the secondary AMF 47, and the process steps of Step S108 and Step S109 may be performed by the AMF 47, the SMF 48, and the UPF 49 on the site system 43 side.

Step S103 of FIG. 6 is illustrated as an explicit determination process, but instead of the process, the CU 46 may acquire information indicating the AMF 47 stored in association with the network slice to which connection is requested, and transmit the control requests to the acquired AMF 47.

In this case, when the communication terminal 20 starts communication via the antenna 17 included in the base station system 42, a process similar to that in FIG. 6 is executed. When the communication terminal 20 starts communication via the antenna 17, and also when connecting to the site connection network, in Step S104, the communication terminal 20 transmits a communication control request to the AMF 47 which corresponds to the site connection network and which is in the core network system 41, and in Step S105, a communication path may be established by the SMF 48 in the core network system 41. A communication terminal may be prohibited from connecting to the site connection network via the antenna 17 included in the base station system 42. Further, permission and prohibition of a communication terminal to connect to the site connection network via the antenna 17 may be controlled by a system arranged in the core network system 41 or the like.

Figure 7:
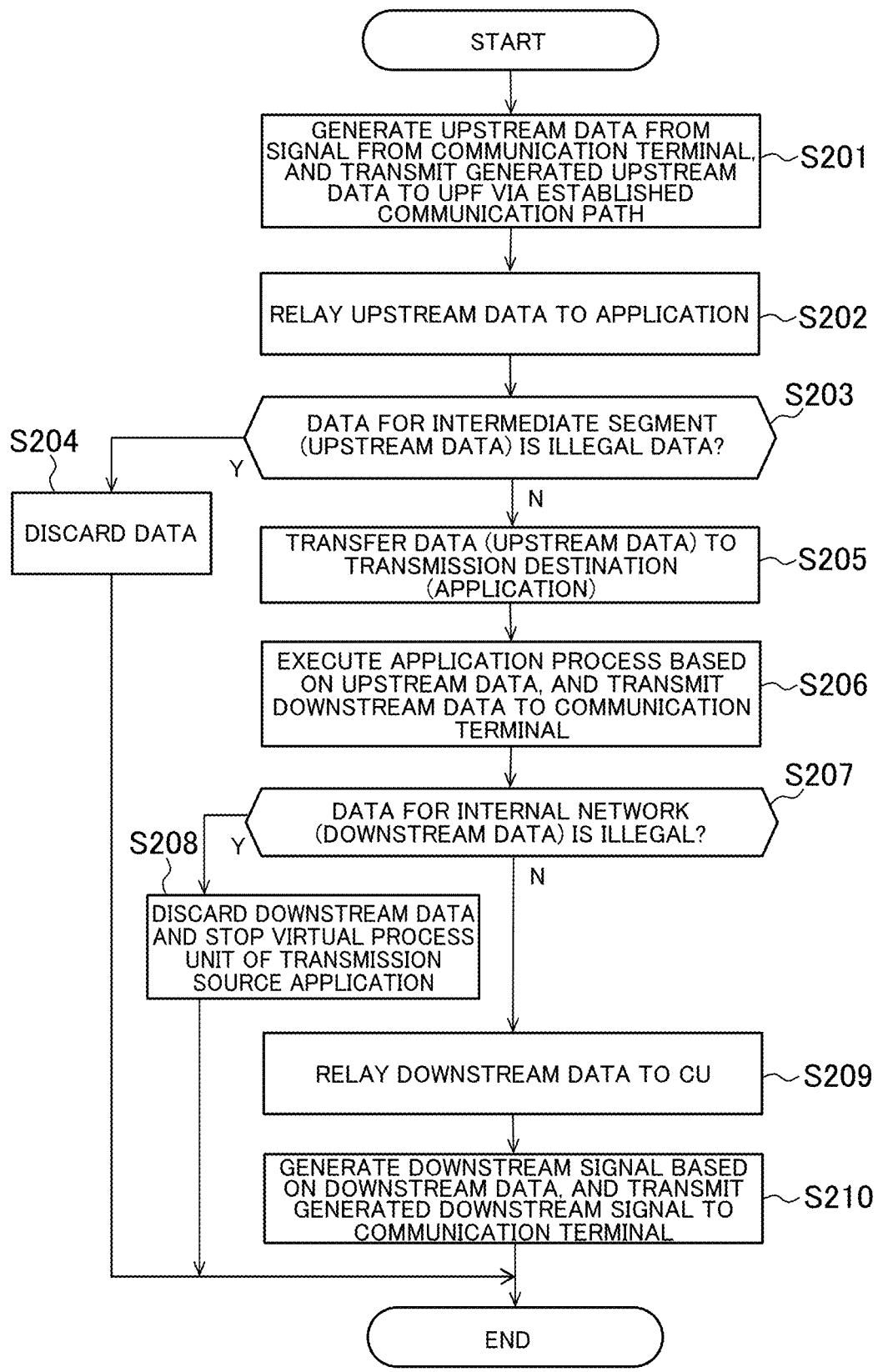
FIG. 7 is a diagram for illustrating an example of a process of the site system performed when a communication terminal accesses an application.

Next, a process performed when the communication terminal 20 and an application communicate is described. FIG. 7 is a diagram for illustrating an example of the process of the site system 43 performed when the communication terminal 20 communicates to and from an application. The descriptions with reference to FIG. 7 are of processes which focus on one piece of data or one packet, in which it looks as though a plurality of processes are executed sequentially. In reality, the plurality of processes may be executed in parallel on different pieces of data or packets.

First, the DU 45 and the CU 46 which execute the signal process generate upstream data from a signal transmitted from the communication terminal 20, and transmit the upstream data to the UPF 49 via the established communication path (Step S201). When the upstream data is received by the UPF 49 which executes the site relay process, the UPF 49 relays the upstream data to the application (Step S202).

The relayed upstream data is input to the first firewall 54 before reaching the application. The first firewall 54 which executes the first firewall process determines whether or not the data heading for the intermediate segment (here, upstream data heading for the application) is illegal data (Step S203). When the data is determined to be illegal ("Y" in Step S203), the first firewall 54 discards the data (Step S204), and a process is not performed by the application.

Meanwhile, when the data is determined to be normal ("N" in Step S203), the first firewall 54 transfers the data (upstream data) to the transmission destination (application) (Step S205). The application which executes the application process executes the application process based on the upstream data, and transmits downstream data to the communication terminal 20 (Step S206).

The downstream data transmitted from the application is input to the first firewall 54. The first firewall 54 which executes the first firewall process determines whether or not data heading for the internal network (here, downstream data) is illegal (Step S207). When the data is determined to be illegal ("Y" in Step S208), the first firewall 54 discards the data, and causes the virtualization platform 71 to stop the virtual process unit of the transmission source application (Step S208). At this time, information indicating the application or virtual process unit which has transmitted the data determined to be illegal may be passed from the first firewall 54 to the virtualization platform 71.

Meanwhile, when the data is determined to be normal ("N" in Step S207), the first firewall 54 transfers the data (downstream data) to the UPF 49. The UPF 49 which executes the site relay process relays downstream data to the CU 46 via the communication path (Step S209), and the DU 45 and the CU 46 generate a downstream signal based on the downstream data, and transmit the signal to the communication terminal 20 via the RU 44 (Step S210).

In this case, the virtual process unit of the application is under the control of the virtualization platform 71 controlled by the communication operator. Thus, as illustrated in Step S208, when data heading for the internal network 51 from an application is detected as being illegal, the virtualization platform 71 can reliably stop the application together with the virtual process unit. As a result, security can be improved. This is particularly effective for protecting the core network of a communication operator requiring high security from illegal communication caused by a local breakout at a site. In the conventional technology, the devices of the communication operator and the servers executing the applications are physically separated in order to mark out boundaries of responsibility. Moreover, in the prior art, there is also no arranging of virtual process units for executing applications under the control of the virtualization platform 71 controlled by the communication operator.

It is possible to improve security by causing the first firewall 54 and the virtualization platform 71 to work together in this way. Further, the virtualization platform 71 manages not only the virtual process units but also the networks connected to the virtual process units. Thus, it is possible to prevent security issues from occurring due to a third party providing an application or a physical intruder performing a network connection different from that originally intended.

In the site system 43, by combining applications, NFs, and the like into a virtual process unit, it is possible to efficiently use the resources of the server 31, and thus, for example, it is also possible to reduce the number of servers arranged at the site.

Figure 8:
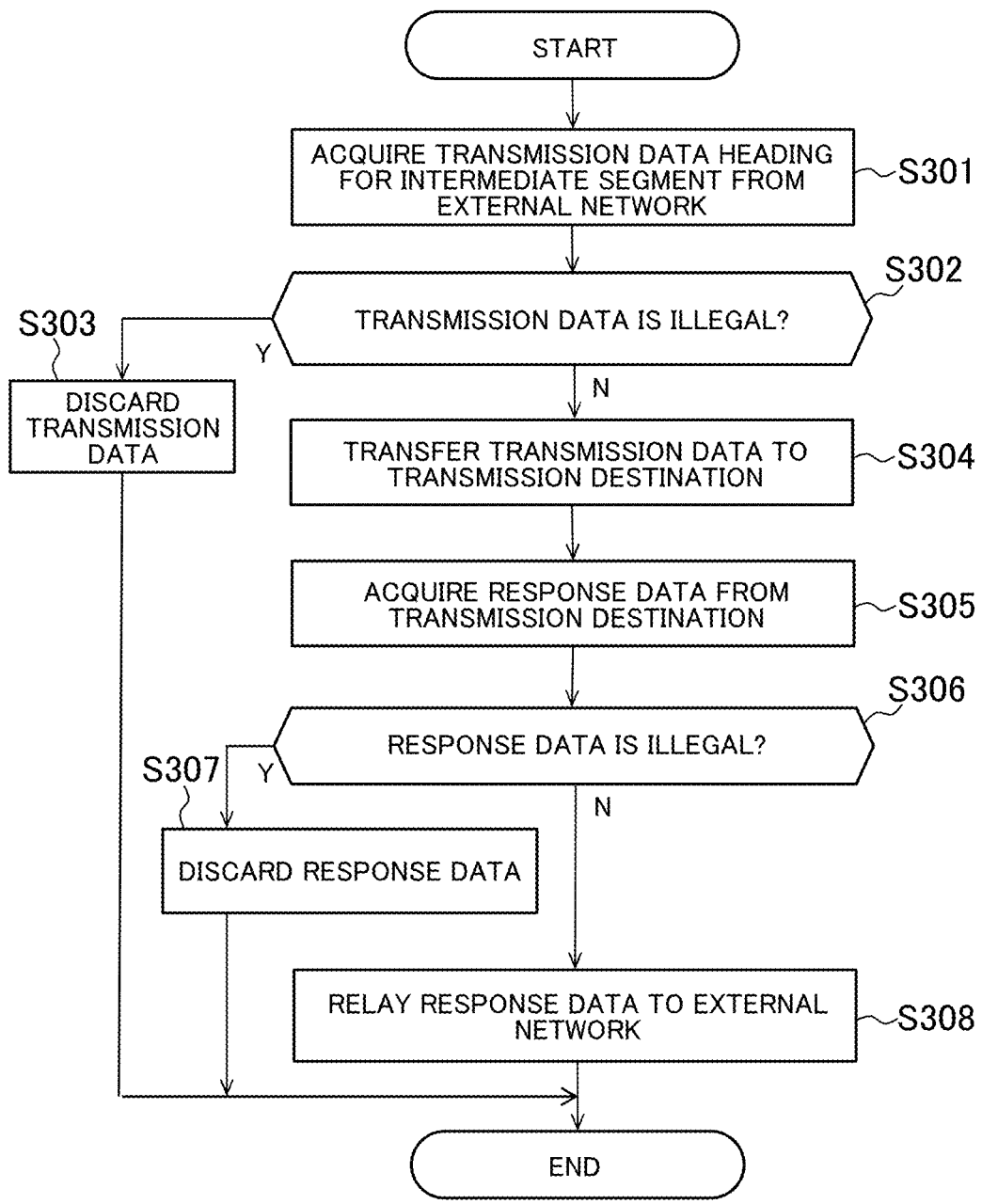
FIG. 8 is a diagram for illustrating an example of a process of a second firewall.

Next, a process performed when communication occurs between the intermediate segment 52 and the external network 53 is described. FIG. 8 is a diagram for illustrating an example of a process of the second firewall. In FIG. 8, there is given a description which particularly describes a process for data and packets heading from the external network 53 to the intermediate segment 52, but the same process may be performed for data and packets heading in the opposite direction. The descriptions with reference to FIG. 8 is of a process which focuses on one piece of data or one packet, but in reality the process may be executed in parallel on a plurality of pieces of data or packets.

First, the second firewall 55 which executes the second firewall process acquires transmission data heading for the intermediate segment 52 (for example, an application) from the external network 53 (Step S301).

The second firewall 55 determines whether or not the transmission data is illegal data (Step S302). When the transmission data is determined to be illegal ("Y" in Step S302), the second firewall 55 discards the data (Step S303), and the transmission data does not reach the transmission destination.

Meanwhile, when the transmission data is determined to be normal ("N" in Step S302), the second firewall 55 transfers the transmission data to the transmission destination (for example, an application) (Step S304). The transmission destination (for example, an application which executes the application process) executes the process based on the transmission data, generates response data, and transmits the generated response data to the external network 53.

The response data is input to the second firewall 55. The second firewall 55 which executes the second firewall process determines whether or not the response data is illegal (Step S306). When the response data is determined to be illegal ("Y" in Step S306), the second firewall 55 discards the response data (Step S307). Meanwhile, when the response data is determined to be normal ("N" in Step S306), the second firewall 55 relays the response data to the external network 53 (Step S308).

The intermediate segment 52 is protected by the second firewall 55, and the internal network 51 is further protected by the first firewall 54 as well. The intermediate segment 52 in which the applications are present has characteristics similar to those of a DMZ in which a web server is arranged, for example. Arranging the applications in a DMZ enables entry from the outside and entry into the internal network 51 and the core network to be prevented. In addition, the first firewall 54 can prevent intrusions from the core network side into the applications in the intermediate segment 52. Further, even when there is an illegal intrusion into a virtual process unit of an application, the first firewall 54 and the second firewall 55 can protect the system on the core network side and the system on the external network side.

In order to ensure the security of the applications, the distribution system 72 for updating the applications is arranged in the core network of the communication operator. There is now described distribution of a program (executable instruction group) by the distribution system 72.

Figure 9:
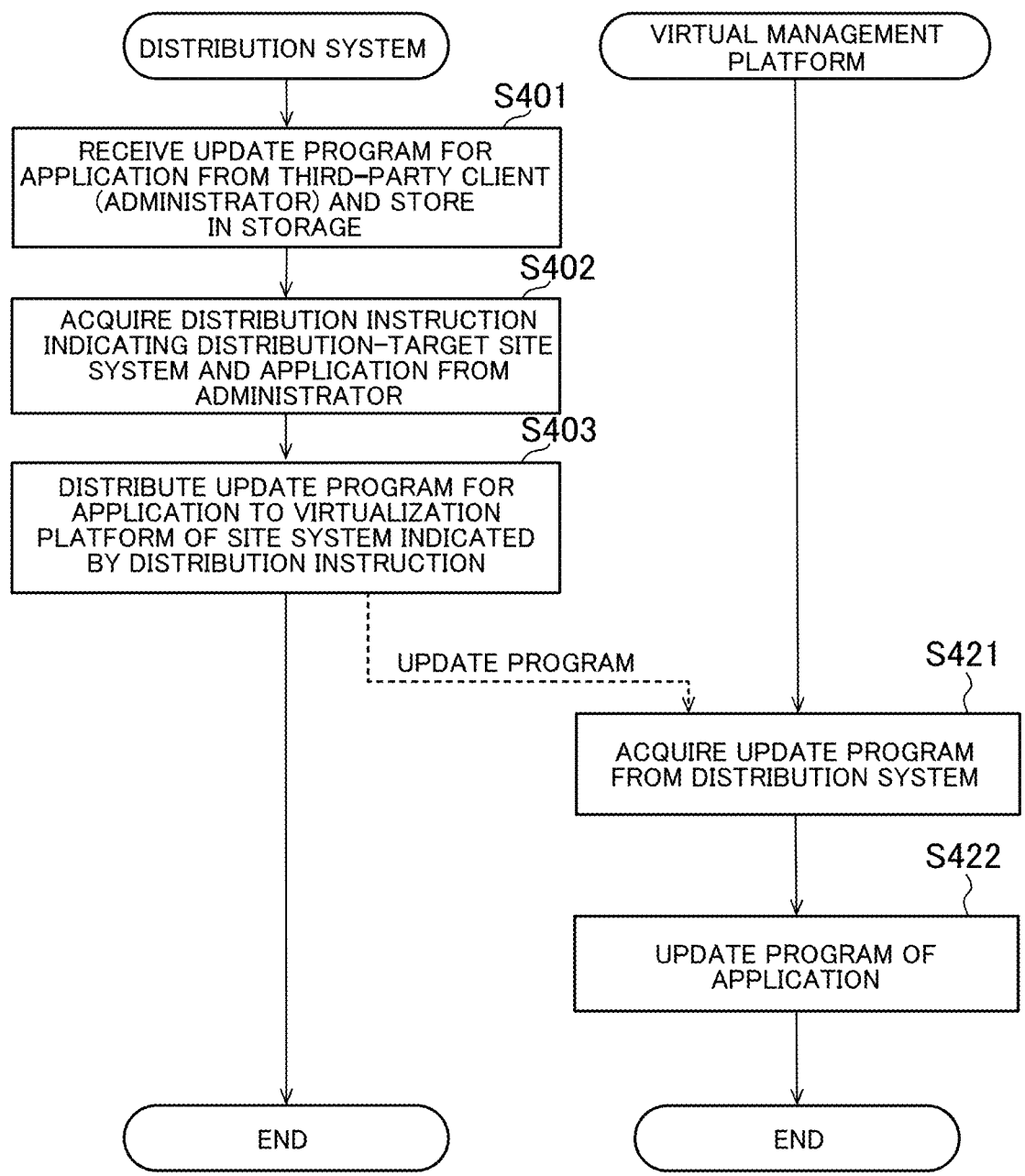
FIG. 9 is a diagram for illustrating an example of a process of a distribution system and a virtualization platform.

FIG. 9 is a diagram for illustrating an example of a process of the distribution system 72 and the virtualization platform 71. First, the distribution system 72 which executes the distribution process receives an update program for an application from a third-party client (third-party administrator), and stores the received update program in the storage 30*b* (Step S401). Next, the distribution system 72 acquires, from the third-party client (third-party administrator), a distribution instruction indicating the distribution-target site system 43 and the application (Step S402). When the distribution system 72 acquires the distribution instruction, the distribution system 72 distributes, via the internal network 51, the update program for the application indicated by the distribution instruction to the virtualization platform 71 of the site system 43 indicated by the distribution instruction (Step S403).

When the update program is distributed to the virtualization platform 71, the virtualization platform 71 acquires the update program for the application from the distribution system 72 (Step S421). The virtualization platform 71 then updates the program (executable instruction set) of the application based on the update program (Step S422).

As described above, the virtual process unit of the application is under the control of the virtualization platform 71 controlled by the communication operator, management of the application is performed by the virtualization platform 71, and illegal communication to the internal network 51 is detected, for example. Thus, when an anomaly occurs such as detection of illegal communication from an application, the communication operator can easily take measures by using the virtualization platform 71 to stop the virtual process unit which executes the application, for example. As a result, security can be improved. In addition, by enabling applications to be updated from the core network side rather than the Internet, and by having the communication operator manage the distribution system 72, it is possible to prevent illegal applications from being distributed, and security can be further increased against entry from the outside.

It should be noted that the present disclosure is not limited to the above-mentioned embodiment. The configurations disclosed in the embodiment may be combined in various ways. Further, within the scope of the technical idea of the present disclosure, a part of the configurations described in this embodiment may be modified.

Further, the functional unit in this embodiment may be implemented through use of a hypervisor-type or host-type virtualization technology instead of the container-type virtualization technology. Further, the functional unit in this embodiment is not required to be implemented by software, and may be implemented by hardware, for example, by an electronic circuit. Further, the functional unit in this embodiment may be implemented by a combination of an electronic circuit and software.

As can be understood from the above description of the embodiment, in the present application, a variety of technical ideas including the disclosure described below are disclosed.

(1) There is provided a communication system including a site antenna and one or more processors arranged at a site, the communication system executing, by causing at least one of the one or more processors arranged at the site to execute a program of a communication service when an application process which provides an application service is executed in an intermediate segment which is one of networks in the site: a signal process of acquiring upstream data from a signal from a communication terminal via the site antenna, the upstream data being data heading for a core network system; a relay process of relaying the acquired upstream data to the intermediate segment based on a predetermined condition in an internal network which is one of the networks in the site and is communicable to and from the core network system; first firewall process of detecting an anomaly in communication between the internal network and the intermediate segment; and a management process of managing a virtual process unit which executes at least a part of the signal process and the relay process, wherein provision of the application service to the communication terminal is managed by the management process.

(2) In the communication system of Item (1), the management process is executed by a virtualization platform in which a virtual process unit which executes at least a part of the signal process, the relay process, and the first firewall process and a virtual process unit which executes the application process are constructed.

(3) In the communication system of Item (1) or (2), the management process further includes a process of stopping a virtual process unit which executes the application process when the first firewall process detects illegal communication from the application process.

(4) In the communication system of any one of Items (1) to (3), the application service includes at least a part of a nurse call process, a SIP process, a database process, and an advertisement distribution process.

(5) In the communication system of any one of Items (1) to (4), the internal network is connected to the core network system via a mobile backhaul.

(6) In the communication system of any one of Items (1) to (5), the upstream data is relayed by the relay process when the communication terminal connects to a network slice corresponding to the site, and the upstream data is relayed by the core network system when the communication terminal does not connect to the network slice.

(7) In the communication system of any one of Items (1) to (6), the first firewall process detects the anomaly in communication between the internal network and the intermediate segment by at least a part of packet filtering, application-level filtering, and an illegal intrusion detection process.

(8) In the communication system of any one of Items (1) to (7), the communication system executes, by causing the at least one of the one or more processors arranged at the site to execute a program of the communication service, a second firewall process of detecting an anomaly in communication between the intermediate segment and an external network.

(9) In the communication system of Item (8), the external network is connected to Internet.

(10) In the communication system of Item (8) or (9), the second firewall process detects the anomaly in communication between the intermediate segment and the external network by at least a part of packet filtering, application-level filtering, and an illegal intrusion detection process.

(11) In the communication system of any one of Items (1) to (10), a program which implements the application process is provided by an app operator which provides the application service and which is different from an operator which manages the communication service.

(12) In the communication system of any one of Items (1) to (11), the communication system further includes one or more processors arranged in a data center, at least one of the one or more processors arranged in the data center executes a distribution process of distributing an update program for a program which implements the application process to the site via the internal network, and the at least one of the one or more processors arranged at the site executes an update process of updating the program which implements the application process based on the distributed update program.

(13) In the communication system of Item (12), the distribution process includes a process of distributing the update program via the internal network when a distribution instruction is received via Internet from an app operator different from an operator which manages the communication service.

(14) There is provided a communication management method including: causing at least one of one or more processors arranged at a site executing a program of an app operator to execute an application process of communicating in an intermediate segment which is a network in the site and providing an application service of the app operator; and causing the at least one of the one or more processors arranged at the site executing a program provided by a communication operator different from the app operator to execute: a signal process of acquiring, from a communication terminal via an antenna arranged at the site, upstream data which is data heading for a core network from a signal; a relay process of relaying the acquired upstream data to a virtual process unit which executes the application process based on a predetermined condition in an internal network which is one of networks in the site and is communicable to and from the core network system; and a first firewall process of detecting an anomaly in communication between the internal network and the intermediate segment; and a management process controlled by the communication operator of managing a virtual process unit which executes at least a part of the signal process and the relay process, wherein the virtual process unit which provides the application service of the app operator is managed by the management process controlled by the communication operator.

The invention claimed is:

1. A communication management method, comprising:
   causing at least one of one or more processors arranged at a site executing a program of an app operator to execute an application process of communicating in an intermediate segment which is a network in the site and providing an application service of the app operator; and
   causing the at least one of the one or more processors arranged at the site executing a program provided by a communication operator different from the app operator to execute:
      a signal process of acquiring, from a communication terminal via an antenna arranged at the site, upstream data which is data heading for a core network from a signal;
      a relay process of relaying the acquired upstream data to a virtual process unit which executes the application process based on a predetermined condition in an internal network which is one of networks in the site and is communicable to and from the core network system; and
      a first firewall process of detecting an anomaly in communication between the internal network and the intermediate segment; and
      a management process controlled by the communication operator of managing a virtual process unit which executes at least a part of the signal process and the relay process,
   wherein the virtual process unit which provides the application service of the app operator is managed by the management process controlled by the communication operator.

2. A communication system, comprising a site antenna and one or more processors arranged at a site,
   the communication system executing, by causing at least one of the one or more processors arranged at the site to execute a program of a communication service when an application process which provides an application service is executed in an intermediate segment which is one of networks in the site:
      a signal process of acquiring, from a communication terminal via the site antenna, upstream data which is data heading for a core network system from a signal;
      a relay process of relaying the acquired upstream data to the intermediate segment based on a predetermined condition in an internal network which is one of the networks in the site and is communicable to and from the core network system;
      a first firewall process of detecting an anomaly in communication between the internal network and the intermediate segment; and
      a management process of managing a virtual process unit which executes at least a part of the signal process and the relay process,
   wherein provision of the application service to the communication terminal is managed by the management process.

3. The communication system according to claim 2, wherein the management process is executed by a virtualization platform in which a virtual process unit which executes at least a part of the signal process, the relay process, and the first firewall process and a virtual process unit which executes the application process are constructed.

4. The communication system according to claim 2, wherein the management process further includes a process of stopping a virtual process unit which executes the application process when the first firewall process detects illegal communication from the application process.

5. The communication system according to claim 2, wherein the application service includes at least a part of a nurse call process, a SIP process, a database process, and an advertisement distribution process.

6. The communication system according to claim 2, wherein the internal network is connected to the core network system via a mobile backhaul.

7. The communication system according to claim 2, wherein the upstream data is relayed by the relay process when the communication terminal connects to a network slice corresponding to the site, and the upstream data is relayed by the core network system when the communication terminal does not connect to the network slice.

8. The communication system according to claim 2, wherein the first firewall process detects the anomaly in communication between the internal network and the intermediate segment by at least a part of packet filtering, application-level filtering, and an illegal intrusion detection process.

9. The communication system according to claim 2, wherein the communication system executes, by causing the at least one of the one or more processors arranged at the site to execute a program of the communication service, a second firewall process of detecting an anomaly in communication between the intermediate segment and an external network.

10. The communication system according to claim 9, wherein the external network is connected to Internet.

11. The communication system according to claim 9, wherein the second firewall process detects the anomaly in communication between the intermediate segment and the external network by at least a part of packet filtering, application-level filtering, and an illegal intrusion detection process.

12. The communication system according to claim 2, wherein a program which implements the application process is provided by an app operator which provides the application service and which is different from an operator which manages the communication service.

13. The communication system according to claim 2, further comprising one or more processors arranged in a data center,
   wherein at least one of the one or more processors arranged in the data center executes a distribution process of distributing an update program for a program which implements the application process to the site via the internal network, and
   wherein the at least one of the one or more processors arranged at the site executes an update process of updating the program which implements the application process based on the distributed update program.

14. The communication system according to claim 13, wherein the distribution process includes a process of distributing the update program via the internal network when a distribution instruction is received via Internet from an app operator different from an operator which manages the communication service.

* * * * *